US008792706B2

(12) United States Patent
Li et al.

(10) Patent No.: US 8,792,706 B2
(45) Date of Patent: *Jul. 29, 2014

(54) DETERMINING AN ORIENTATION DIRECTION OF A COLOR EDGE AT A PIXEL LOCATION IN A COLOR IMAGE

(75) Inventors: Xing Li, Webster, NY (US); Meng Yao, West Linn, OR (US); Barbara L. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/426,308

(22) Filed: Mar. 21, 2012

(65) Prior Publication Data

US 2012/0177286 A1     Jul. 12, 2012

Related U.S. Application Data

(63) Continuation-in-part of application No. 12/754,096, filed on Apr. 5, 2010, now Pat. No. 8,340,396.

(51) Int. Cl.
*G06K 9/00*     (2006.01)

(52) U.S. Cl.
USPC ............ 382/149; 382/165; 382/162; 358/1.9; 358/3.06; 358/1.8

(58) Field of Classification Search
USPC ................ 382/149, 165, 162; 358/1.14, 3.26, 358/3.06, 1.9
See application file for complete search history.

(56) References Cited

U.S. PATENT DOCUMENTS

| | | | |
|---|---|---|---|
| 5,778,105 A * | 7/1998 | Shively | 382/269 |
| 6,021,256 A * | 2/2000 | Ng et al. | 358/1.9 |
| 6,377,711 B1 | 4/2002 | Morgana | |
| 6,385,337 B1 * | 5/2002 | Klassen | 382/166 |
| 7,079,281 B1 * | 7/2006 | Ng et al. | 358/1.9 |
| 7,199,888 B2 * | 4/2007 | Parker et al. | 358/1.14 |
| 2003/0090689 A1 * | 5/2003 | Klassen | 358/1.9 |
| 2003/0174352 A1 * | 9/2003 | Yamada et al. | 358/1.9 |
| 2010/0277770 A1 | 11/2010 | Yao | |
| 2011/0051197 A1 * | 3/2011 | Yao et al. | 358/3.06 |
| 2011/0243429 A1 | 10/2011 | Yao | |

* cited by examiner

*Primary Examiner* — Tarifur Chowdhury
*Assistant Examiner* — Isiaka Akanbi
(74) *Attorney, Agent, or Firm* — Philip E. Blair; Fleit Gibbons Gutman Bongini & Bianco P.L.

(57) ABSTRACT

What is disclosed is a system and method for determining an orientation direction of a color edge at a given pixel location in a binary color image. The orientation direction of the color edge is determined from eight pixel counts with each pixel count being a total number of pixels in each of eight regions of a window centered about a candidate pixel which resides along the color edge. The eight regions are associated with 8 compass points. The orientation of the edge is determined by a $1^{st}$, $2^{nd}$ and $3^{rd}$ tier control bits which are based upon the pixel counts of each region. The $1^{st}$, $2^{nd}$ and $3^{rd}$ tier control bits collectively form a 3-bit word. The 3-bit word defines the orientation direction. The teachings hereof provide an efficient way of performing binary edge orientation detection by making uses of intermediate results to simultaneously encode the edge orientation.

15 Claims, 11 Drawing Sheets

| $R_0C_0$ (M) | $R_0C_1$ (C) | $R_0C_2$ (C) | $R_0C_3$ (C) | $R_0C_4$ (C) | $R_0C_5$ (W) | $R_0C_6$ (W) |
|---|---|---|---|---|---|---|
| $R_1C_0$ (M) | $R_1C_1$ (C) | $R_2C_2$ (C) | $R_3C_3$ (C) | $R_4C_4$ (C) | $R_5C_5$ (W) | $R_6C_6$ (W) |
| $R_2C_0$ (M) | $R_2C_1$ (C) | $R_2C_2$ (C) | $R_2C_3$ (C) | $R_2C_4$ (W) | $R_2C_5$ (W) | $R_2C_6$ (W) |
| $R_3C_0$ (M) | $R_3C_1$ (M) | $R_3C_2$ (C) | $R_3C_3$ (C) | $R_3C_4$ (W) | $R_3C_5$ (W) | $R_3C_6$ (W) |
| $R_4C_0$ (M) | $R_4C_1$ (M) | $R_4C_2$ (C) | $R_4C_3$ (C) | $R_4C_4$ (W) | $R_4C_5$ (W) | $R_4C_6$ (W) |
| $R_5C_0$ (W) | $R_5C_1$ (M) | $R_5C_2$ (C) | $R_5C_3$ (C) | $R_5C_4$ (C) | $R_5C_5$ (W) | $R_5C_6$ (W) |
| $R_6C_0$ (M) | $R_6C_1$ (M) | $R_6C_2$ (C) | $R_6C_3$ (C) | $R_6C_4$ (C) | $R_6C_5$ (W) | $R_6C_6$ (W) |

DETERMINING AN ORIENTATION DIRECTION OF A COLOR EDGE AT A PIXEL LOCATION IN A COLOR IMAGE

CROSS REFERENCE TO RELATED APPLICATION

The present patent application is a continuation-in-part of co-pending and commonly owned U.S. Publication No. 2011/0243429, entitled "Color Trapping On A Halftoned Bi-level Bitmap", (U.S. application Ser. No. 12/754,096), which is incorporated herein in its entirety by reference. This application is related to concurrently filed and commonly owned U.S. patent application Ser. No. 13/426,203.

TECHNICAL FIELD

The present invention is directed to systems and methods for qualifying color pixels for color trapping on a halftoned bi-level bitmap of a color image in an image processing system.

BACKGROUND

When printing, for example, using a color inkjet printer, the color is applied at once to the paper. Each color generally ends up where it is expected. When printing, in commercial printing presses, a document consisting of more than one color of ink requires that the single page pass through the printing press multiple times as each color is applied to the paper. Sometimes the paper or the plates applying the ink shift. It might be a tiny shift but sufficient to be noticeable. For example, a white gap may appear between a cyan letter that is supposed to be touching a magenta box. When this happens, the color is said to be out-of-register. Color-to-color misregistration refers to misregistration between color separations in a printed image. Misregistration in printed halftoned images can result in image defects such as, for instance, white gaps between a two color edge.

One general approach for correcting for misregistration is to expand one of the abutting regions' separations to fill the misregistration border region with a color determined to minimize the visual effect when printed. Borders or edges that have been expanded from a region of one color to a region of another color, in this manner, are said to be "spread", i.e., the submissive color is spread into an area of the dominant color. A border which has been expanded is referred to as a "trap". The zone within which color has been added is called the "trap zone". Misregistration of colors in a printing device can, in many instances, be compensated for by a process often referred to as "trapping" which is a term of art used to describe a hardware and/or software process for compensating for a small amount that the paper tends to wander as it travels through the print system. Trapping compensates for mechanical shifts or stretching of paper or plates in the printing process and provides an overlap of colors to prevent unprinted paper from showing in the final printed product. This is not to be confused with the terms "wet trapping" or "dry trapping" which are terms used to describe behaviors between inks or between ink and paper. Trapping helps preserve the integrity or the shape of an image such as block serifs. Without trapping, unsightly gaps may be visible between two colors that are supposed to be touching. With trapping, one color is made to overlap the other by extending that color into a surrounding area. This allows the colors to keep touching one another, even as the paper wanders.

Trapping is often accomplished with features built into software algorithms devoted to trapping methods. Many commercial printing devices perform a trapping method. In many systems, applications for color trapping require edge detection be performed and an orientation direction of that edge determined. U.S. patent application Ser. No. 12/754,096, entitled: "Color Trapping On A Halftoned Bi-Level Bitmap", by Meng Yao, (U.S. Publication No. 2011/0243429), discloses a binary color detection algorithm which checks the orientation of edges of different color planes at a pixel locations in the bi-level bitmap. While this algorithm produces robust results, edge orientation determination is complicated and expensive to implement.

Accordingly, what is needed in this art is a system and method for determining an orientation direction of a color edge at a given pixel location in a halftoned color image which provides a cost-effective solution that can be readily implemented in hardware to enable the integration of sophisticated image processing techniques into low cost print devices.

BRIEF SUMMARY

What is disclosed is a system and method for determining an orientation direction of a color edge at a given pixel location in bi-level bitmap of a halftoned color image. The total number of pixels of a given color are counted in each of eight regions of a window centered about a pixel of interest. The eight regions of the window are associated with the points of a compass, i.e., {N., E., S., W., NE., SW., NW., SE.}. In a manner more fully disclosed herein, $1^{st}$, $2^{nd}$ and $3^{rd}$ tier control bits are obtained which collectively form a 3-bit word that defines the orientation. The teachings hereof provide an efficient way of determining binary edge strength and orientation by making uses of intermediate results created in calculating a minimum pixel count of all the regions in the window to simultaneously encode the orientation of the edge. Advantageously, hardware resource savings are achieved which, in turn, enable the integration of sophisticated image processing techniques into lower-cost print devices.

In one embodiment, the present method for determining an orientation direction of a color edge at a given pixel location in a color image involves the following: Eight pixel counts are received with each pixel count comprising a total number of pixels of a color in a region of a window centered on a selected pixel in a bi-level bitmap of a halftoned color image. Each of the eight window regions is associated with an orientation direction relative to the selected pixel. In one embodiment, the orientation directions correspond to the 8 points of a compass, given by: {N., NE., E., SE. S., SW., W., NW.}. The pixel counts are compared. A result of each comparison produces a $1^{st}$ tier control bit used to select a largest pixel count for each pair. The four largest pixel counts are compared to each other. The result of each comparison produces a $2^{nd}$ tier control bit used to select a lowest pixel count for each pair. The two lowest pixel counts are compared against each other. The result of this comparison produces a $3^{rd}$ tier control bit used to select a minimum pixel count for this pair. The minimum pixel count is the greatest pixel count of this color of all the regions of the window. The two $2^{nd}$ tier control bits are used to select two of the four $1^{st}$ tier control bits. The $3^{rd}$ tier control bit is used to select one of the two $1^{st}$ tier control bits and one of the two $2^{nd}$ tier control bits. The final $1^{st}$, $2^{nd}$ and $3^{rd}$ tier control bits form a 3-bit word which, in turn, determines the orientation direction for the color edge.

A system for determining an orientation direction of a color edge at a given pixel location in a color image is also disclosed. In one embodiment, the system comprises a first set of four comparators. Each of these comparators receives, as input, two total pixel counts. Each of the 8 pixel counts defines a total number of pixels of a color in a region of a window centered on a selected pixel in a bitmap of a halftoned color image. These four comparators generate, as a result of each comparison, a $1^{st}$ tier control bit. A total of four $1^{st}$ tier control bits are produced by this first set of four comparators. Each of the four $1^{st}$ tier control bits is used to select a smaller of two pixel counts as output. A total of four smaller pixel counts are produced. The system further comprises a second set of two comparators. Each of these two comparators compares two of the four smaller pixel counts produced as by the first four comparators. These two comparators generate, as a result of each comparison, a $2^{nd}$ tier control bit. A total of two $2^{nd}$ tier control bits are produced by this second set of two comparators. These two $2^{nd}$ tier control bits are used to select the two lowest pixel counts of the first four smaller pixel counts. A third comparator compares the two lowest pixel counts produced as output by the second set of two comparators and generates, as a result of this comparison, a $3^{rd}$ tier control bit. The $3^{rd}$ tier control bit is used to select a smaller of the two lowest pixel counts from the last two comparator results. This pixel count is the lowest pixel count for all of the eight regions of the window centered on the candidate pixel. Each of the two $2^{nd}$ tier control bits is used to select two of the four $1^{st}$ tier control bits. The $3^{rd}$ tier control bit is used to select one of the two $1^{st}$ tier control bits and one of the two $2^{nd}$ tier control bits. The selected remaining $1^{st}$, $2^{nd}$ and $3^{rd}$ tier control bits collectively comprise a 3-bit word which defines the orientation direction of the color edge.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 2 illustrates an example 7×7 window labeled in row/column format where $R_x$ indicates row index and $C_y$ indicates column index, where x and y are in the range from 0 to 6, in the 7×7 image subsection of FIG. 1;

FIGS. 3A-B show the window of FIG. 2 divided into north and south regions (FIG. 3A) and divided into east and west regions (FIG. 3B);

FIGS. 4A-B show the window of FIG. 2 divided into northwest and southeast regions separated (FIG. 4A) and divided into southwest and northeast regions (FIG. 4B);

DETAILED DESCRIPTION

Figure 1:
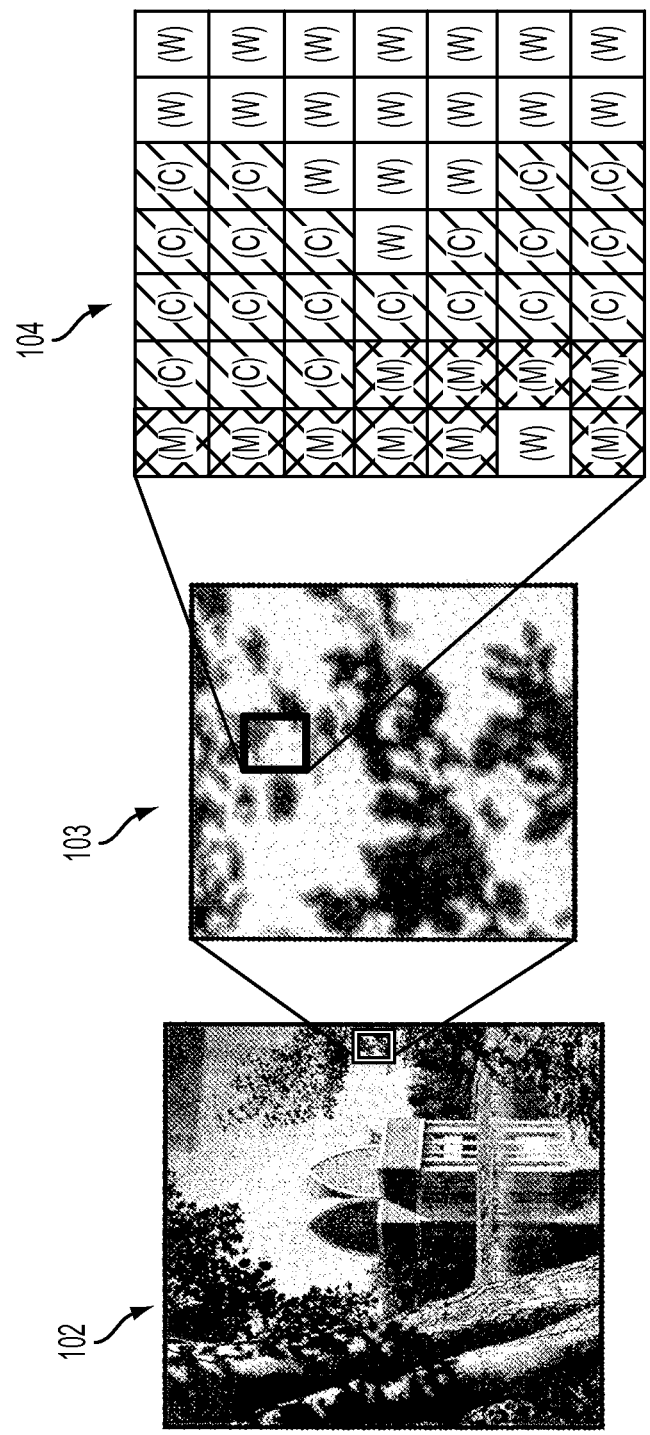
FIG. 1 illustrates an example color image shown as a gray level image.

What is disclosed is a system and method for determining an orientation direction of a color edge at a given pixel location in a bi-level bitmap of a halftoned color image. In a manner more fully disclosed herein, the orientation direction of the color edge is determined from eight pixel counts with each pixel count being a total number of pixels in each of eight regions of a window centered about a candidate pixel which resides along the color edge.

It should be understood that one of ordinary skill in this art would be readily familiar with many facets of color science such as, but not limited to, color space, raster image processing, raster graphics, bi-level bitmaps, halftones and halftoning methods, and other techniques generally known in the color science arts.

NON-LIMITING DEFINITIONS

A "pixel" refers to the smallest segment into which an image can be divided. Pixels of an input image are associated with a color value defined in terms of a color space, such as color, intensity, lightness, brightness, or some mathematical transformation thereof. A pixel is an "adjacent pixel" if it immediately borders a given pixel.

A "bitmap" is a grid of pixels generally characterized by a width and height of the image in pixels and by the number of bits-per-pixel which determines the number of colors a pixel can represent, i.e., color depth of the bitmap.

"Edge detection" is to a method for identifying areas in an image at which the image changes or has discontinuities. The edge created by a border between a region of magenta and a region of cyan would be a cyan-magenta edge. This is referred to as a two color edge.

A "two-color edge" has a side of a first color and a side of a second color. In a four-color CMYK device, the two-color edge may be, for instance, a cyan-magenta edge, a cyan-yellow edge, a magenta-yellow edge, or any color which borders black, for example, a black-cyan edge. If the two-color edge is a cyan-magenta edge then the first side of the two-color edge would be an area of the bitmap dominated by the first color, i.e., cyan, and the second side of the two-color edge would be an area dominated by the second color, i.e., magenta. Edges tend to produce visible artifacts caused by misregistration or print engine artifacts. Artifacts along cyan-yellow edges or magenta-yellow edges tend to be less visible due to the low visibility of yellow. A "cyan edge pixel" on the cyan side of a cyan-magenta edge can be a cyan pixel or any color which is not magenta and does not contain magenta such as, for example, a white pixel can be a cyan edge pixel along a cyan-magenta edge. Likewise, a "magenta edge pixel" is a pixel on the magenta side of a cyan-magenta edge. A magenta edge pixel can be a magenta pixel or any other color that is not cyan and does not contain cyan.

"Dominant" and "Submissive" colors. Generally, darker or stronger colors tend to be dominant colors and lighter or weaker colors tend to be submissive colors. A submissive color is less visible when spread into an area of a dominant color than if a dominant color is spread into an area of submissive color. Cyan is considered a dominant color and yellow is considered a submissive color. Submissive colors tend to change while dominant colors tend to remain unchanged. For example, cyan tends to remains unchanged when a submissive yellow is spread outward into the area where these two colors come into contact. When a dominant color is surrounded by a submissive color, the object represented by the dominant color is said to be "choked" because it gets smaller due to the invasion of the submissive color. Conversely, when a submissive color is surrounded by a dominant color, the submissive color gets "spread" into the surrounding dominant color. There are many ways of determining whether a given color is dominant or submissive. A color's weight, or luminosity, can be used to determine whether that color is dominant or submissive. For example, R, G, B components can be used determine a color's relative darkness by an application of the following:

$$\text{Luminosity}=(0.3*R)+(0.59*G)+(0.11*B).$$

Since various aspects of color perception are subjective, it is suggested that trapping decision tables be implemented and the colors adjusted for specific situations.

A "window" of size n×m, where n and m are greater than 1, forms a grid defining a neighborhood of pixels around a selected. A 7×7 window is shown in FIG. 2 that is centered about a pixel labeled "X". The window does not have to be a square, i.e., n≠m. The size of the window may be adjusted based upon a distance (in pixels) the selected pixel is from a color edge. As discussed herein further, the window is centered about a selected pixel of interest and partitioned into a plurality of regions each having a respective orientation direction relative to that pixel.

"Orientation direction" refers to the location of a particular region of a partitioned window relative to a pixel which is centrally located in a window placed around that pixel. There are eight orientation directions corresponding to the compass points: {N., E., S., W., NE., SW., NW., SE.}. Each of these 8 points corresponds to a 3-bit word: '000'=N., '001'=S., '010'=W., '011'=E., '100'=NW., '101'=SE., '110'=SW., and '111'=NE.

A "total pixel count" is a count of the total number of pixels of a given color that reside in each region of the window.

Example Color Image

FIG. 1 illustrates an example color image 102 shown as a gray level image. Subsection 103 represents a small section cut from image 102. Subsection 104 represents an even smaller portion of subsection 103. Subsection 104 illustrates the individual pixels (cells) of a window of pixels. It should be appreciated that image subsection 104 is not to scale. It should also be appreciated that the sections and subsections of FIG. 1 are illustrative and are provided for explanatory purposes.

Example Window Partitioned into Regions

The following assumes a CMYK device capable of printing: cyan, magenta, yellow, and black, on white paper. The bitmap image has already been halftoned and information regarding the halftone screens used to halftone the image have been preserved. The color of each pixel in the drawings is shown in parenthesis. A pixel labeled '(M)' represents a magenta pixel. A pixel labeled '(C)' represents a cyan pixel. The label '(W)' refers to a white pixel where no color was applied to that pixel location, i.e., the resulting white is from the white paper. The selected pixel of interest is shown positioned at the center of the window and labeled 'X'.

Reference is next being made to the window 200 of FIG. 2 which has 7 rows and 7 columns of pixels. Each pixel in the 7×7 window has a row/column index associated with that pixel location, i.e., $R_xC_y$ where x=0 ... 6, and y=0 ... 6. The top row is row 0 and the bottom row is row 6. The left-most column is column 0 and the right-most column is column 6. By way of example, the magenta (M) pixel (at 202) in the upper left corner of the window 200 has row/column index $R_0C_0$. The white (W) pixel (at 204) in the lower right corner has row/column index $R_6C_6$. Using row/column indexing, pixels corresponding to each of the eight orientation directions associated with the 8 compass points are as follows:

North ($R_x<3$)
Northeast ($C_y>R_x$)
East ($C_y>3$)
Southeast ($R_x+C_y>6$)
South ($R_x>3$)
Southwest ($C_y<R_x$)
West ($C_y<3$)
Northwest ($R_x+C_y<6$)

Figures 3A, 3B:
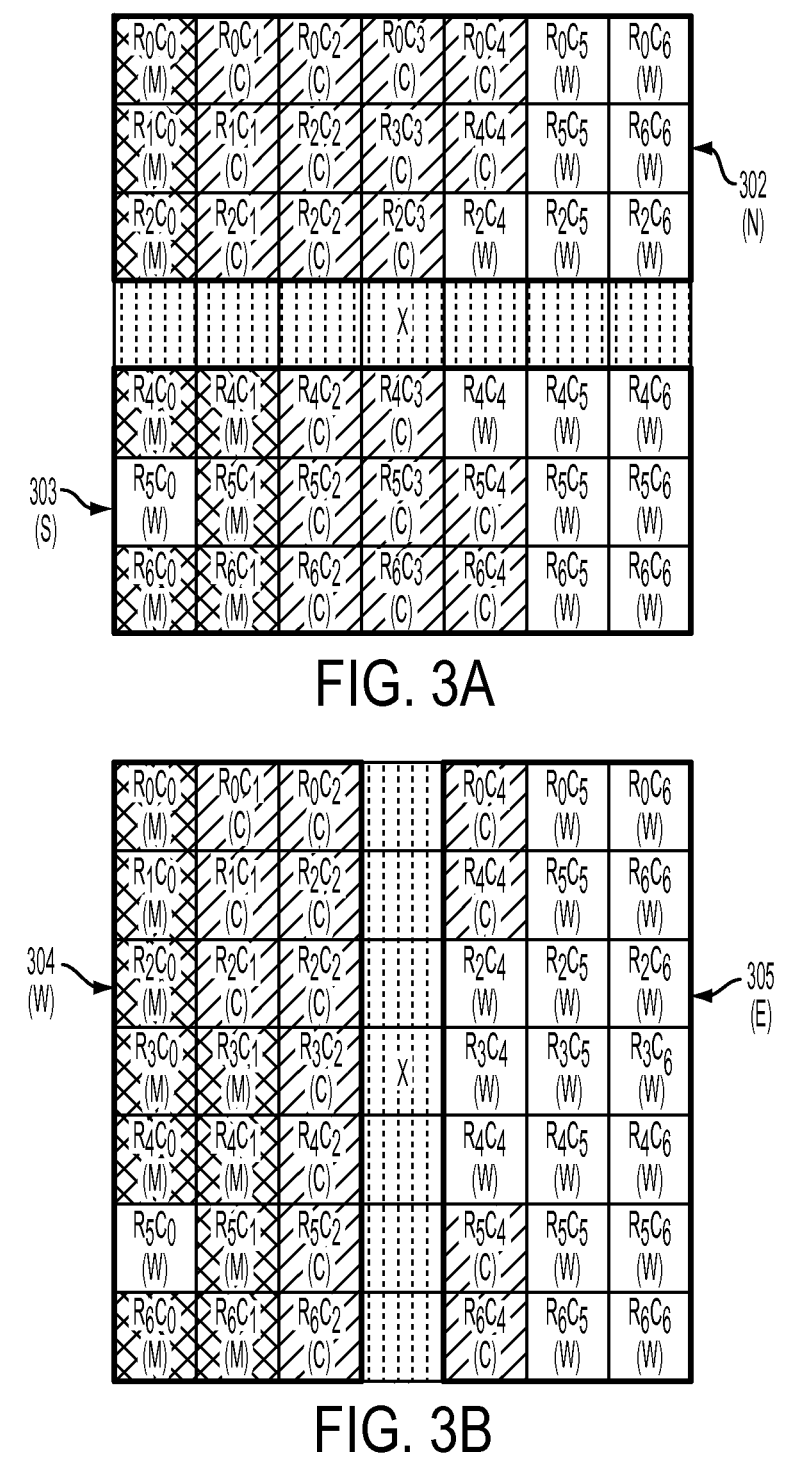

In FIG. 3A, the 7×7 window 200 of FIG. 2 is shown divided into a top and bottom region separated by a row of shaded pixels containing the selected pixel of interest labeled (X). The top region 302 is the north region, i.e., where pixels have a row index of ($R_x<3$). The number of white (W) pixels in the north region is 7. The number of cyan (C) pixels in the north region is 11. The number of magenta (M) pixels in the north region is 3. The bottom region 303 is the south region, i.e., where pixels have a row index of ($R_x>3$). The number of white (W) pixels in the south region is 8. The number of cyan (C) pixels in the south region is 8. The number of magenta (M) pixels in the south region is 5.

In FIG. 3B, the 7×7 window 200 of FIG. 2 is shown divided into a left and right region separated by a column of shaded pixels containing the selected pixel of interest labeled (X). The left region 304 is the west region, i.e., where pixels have a column index ($C_y<3$). The number of white (W) pixels in the west region is 1. The number of cyan (C) pixels in the west region is 10. The number of magenta (M) pixels in the west region is 10. The right region 305 of the window is the east region, i.e., where pixels have a column index ($C_y>3$). The number of white (W) pixels in the east region is 17. The number of cyan (C) pixels in the east region is 4. The number of magenta (M) pixels in the east region is 0. FIGS. 3A-B, collectively, show the North, South, East and West regions of the window of FIG. 2.

Figures 4A, 4B:
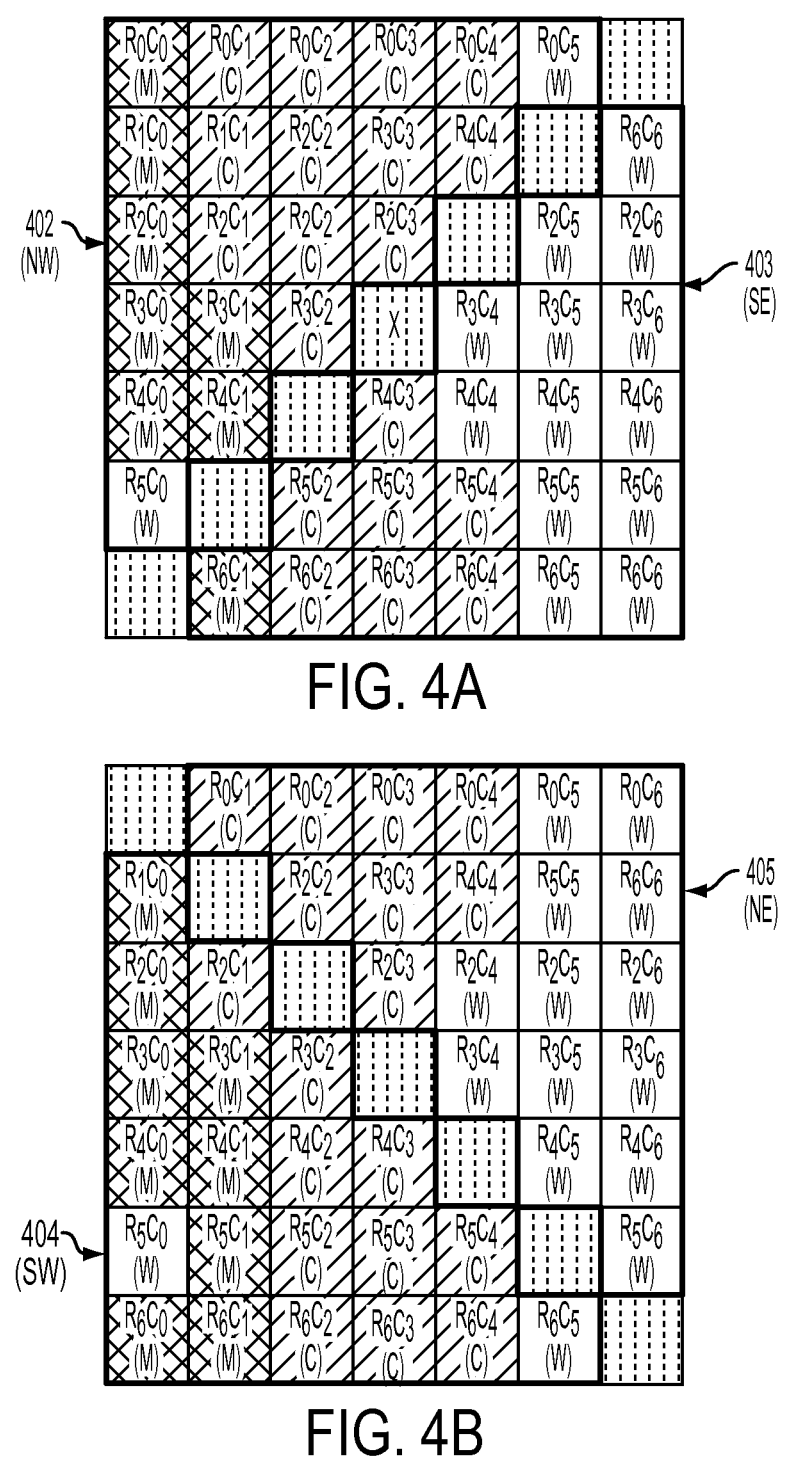

In FIG. 4A, the 7×7 window 200 of FIG. 2 is shown divided along a diagonal from the lower left corner $R_6C_0$ to the upper right corner $R_0C_6$. Northwest region 402 is where pixels have a row/column index where ($R_x+C_y<6$). The number of white (W) pixels in the northwest region is 2. The number of cyan (C) pixels in the northwest region is 12. The number of magenta (M) pixels in the northwest region is 7. Likewise, southeast region 403 is where pixels have a row/column index where ($R_x+C_y>6$). The number of white (W) pixels in the southeast region is 13. The number of cyan (C) pixels in the southeast region is 7. The number of magenta (M) pixels in the southeast region is 1.

In FIG. 4B, the 7×7 window of FIG. 2 is shown divided along a diagonal from the upper left corner $R_0C_0$ to the lower right corner $R_6C_6$. Southwest region 404 is where pixels have a row/column index where ($C_y<R_x$). The number of white (W) pixels in the southwest region is 2. The number of cyan (C) pixels in the southwest region is 10. The number of magenta (M) pixels in the southwest region is 9. Northeast region 405 is where pixels have a row/column index where ($C_y>R_x$). The number of white (W) pixels in the northeast region is 13. The number of cyan (C) pixels in the northeast region is 8. The number of magenta (M) pixels in the northeast region is 0.

Flow Diagram

Figure 5:
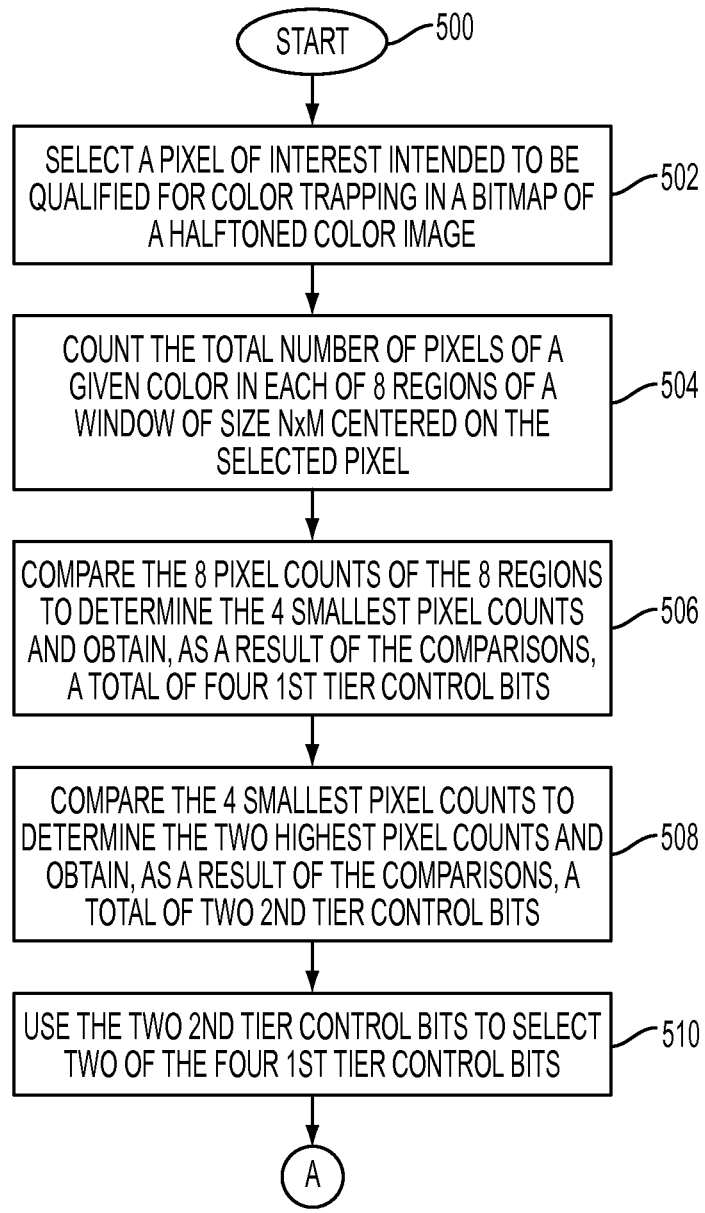
FIG. 5 is a flow diagram which illustrates one example embodiment of the present method for determining an orientation direction of a color edge at a given pixel location in a color image.

Reference is now being made to the flow diagram of FIG. 5 which illustrates one example embodiment of the present method for determining an orientation direction of an edge at a given pixel location in a color image. Flow processing begins at step 500 and immediately proceeds to step 502. The steps of the method are discussed in conjunction with the circuit configurations of FIGS. 7-10.

At step 502, a pixel of interest is selected in a color image for processing. The pixel of interest is intended to be qualified as an edge pixel for color trapping as disclosed in the above-incorporated U.S. Publication No. 2011/0243429, entitled: "Color Trapping On A Halftoned Bi-Level Bitmap", by Meng Yao. For discussion purposes, the selected pixel of interest is the white (W) pixel labeled "X" with a row/column index of $R_3C_3$ located at the center of the n×m window 200 of FIG. 2. The window has been partitioned into 8 regions each corresponding to one of the 8 points of a compass, as shown and discussed with respect to FIGS. 3A-B and 4A-B. A color is selected for processing. For this example, the selected color is cyan. Pixel "X" is being qualified as an edge pixel for color trapping and we need to determine the orientation of the cyan edge with respect to that pixel location.

At 504, the cyan pixels are counted in each of the eight regions of the partitioned window. For discussion purpose, the number of cyan pixels counted in each region is assigned to a variable: {nC, sC, wC, eC, nwC, seC, swC, neC}, where:

nC is the number of cyan pixels in the north region (302 of FIG. 3A).
sC is the number of cyan pixels in the south region (303 of FIG. 3A).
wC is the number of cyan pixels in the west region (304 of FIG. 3B).
eC is the number of cyan pixels in the east region (306 of FIG. 3B).
nwC is the number of cyan pixels in the northwest region (402 of FIG. 4A).
seC is the number of cyan pixels in the southeast region (403 of FIG. 4A).
swC is the number of cyan pixels in the southwest region (404 of FIG. 4B).
neC is the number of cyan pixels in the northeast region (405 of FIG. 4B).

The number of cyan pixels in the north region (302 of FIG. 3A) is 11. So, nC=11. The number of cyan pixels in the south region (303) is 8. So, sC=8. The number of cyan pixels in the west region (304 of FIG. 3B) is wC=10. The number of cyan pixels in the east region (305) is eC=4. The number of cyan pixels in the northwest region (402 of FIG. 4A) is nwC=12. The number of cyan pixels in the southeast region (403) is seC=7. The number of cyan pixels in the southwest region (404 of FIG. 4B) is swC=10. The number of cyan pixels in the northeast region (405) is neC=8. As such, we have: {nC=11, eC=4, sC=8, wC=10, neC=8, swC=10, nwC=12, and seC=7}. These pixel counts corresponding to these respective orientation directions are shown as inputs 701-708 to the $1^{st}$ tier circuit portion 700 of FIG. 7.

Figure 7:
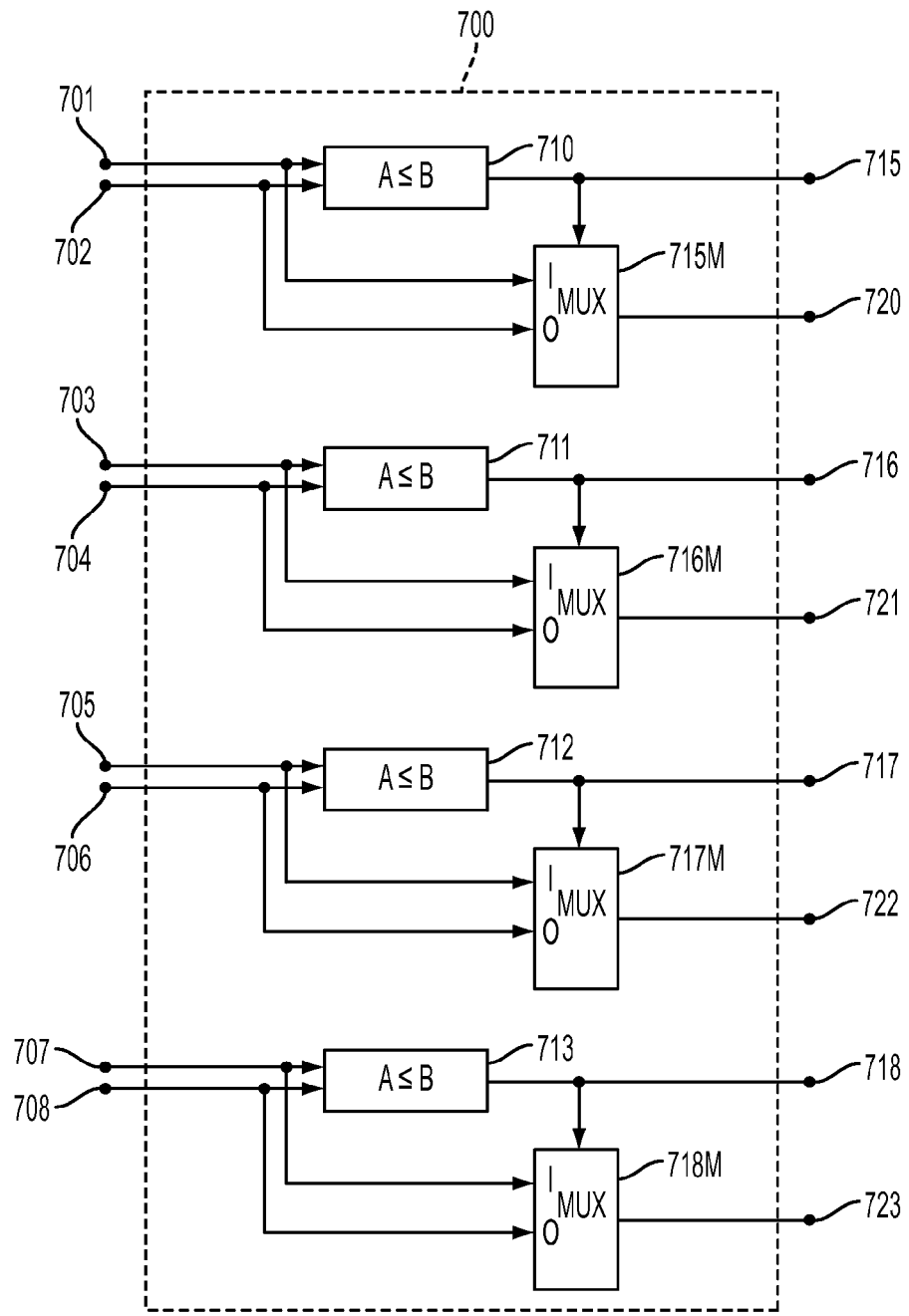
FIG. 7 illustrates a $1^{st}$ tier circuit portion wherein various aspects of the flow diagrams are performed.
Figure 8:
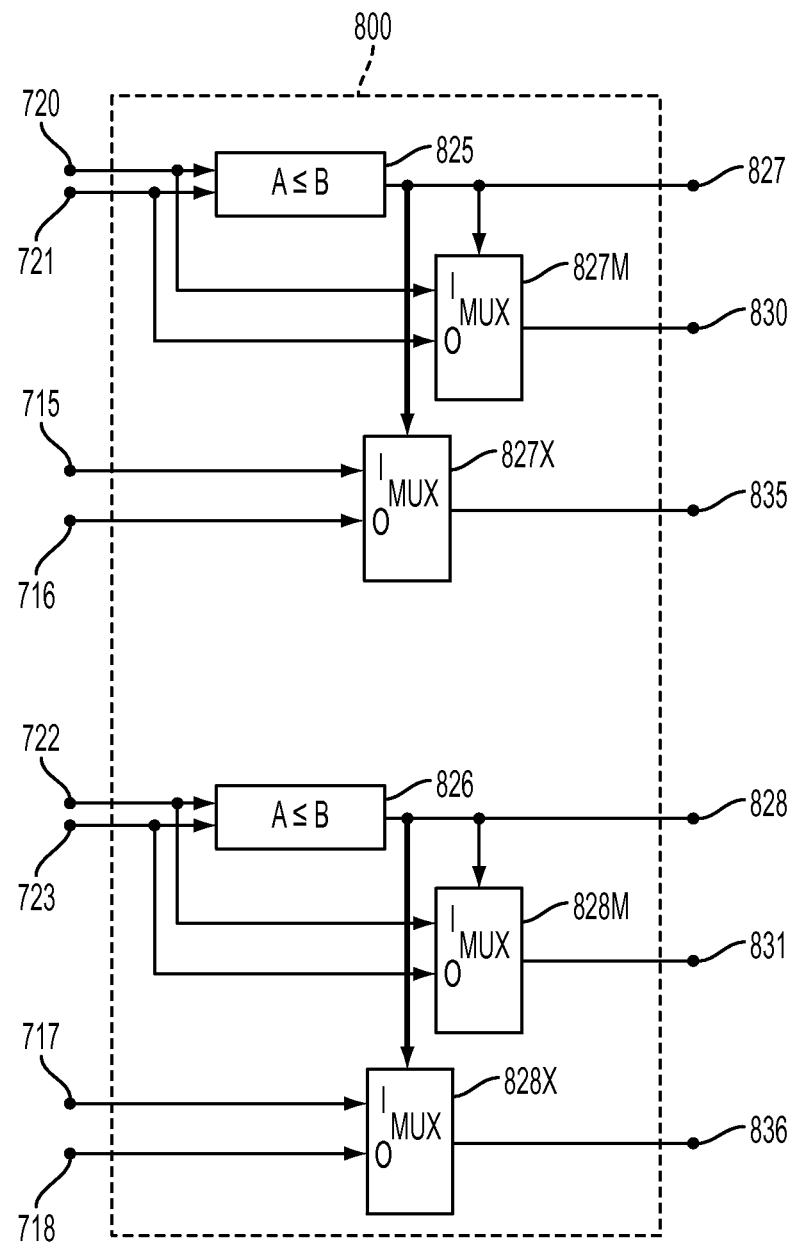
FIG. 8 illustrates a $2^{nd}$ tier circuit portion wherein various aspects of the flow diagrams are performed.

With reference to FIG. 7, pixel count 701 corresponds to the number of cyan pixels in the northeast region (neC=8). Pixel count 702 corresponds to the number of cyan pixels in the southwest (swC=10). Pixel counts 703 and 704 correspond to the number of cyan pixels in the southeast and northwest regions (seC=7 and nwC=12), respectively. Pixel counts 705 and 706 correspond to the number of cyan pixels in the east and west regions (eC=4 and wC=10), respectively.

And, pixel counts 707 and 708 correspond to the number of cyan pixels in the south and north regions (sC=8 and nC=11), respectively.

At step 506, the pixel counts for each of the 8 regions are compared to determine the four largest pixel counts of the eight input pixel counts. First tier comparators 710, 711, 712, 713, perform their respective comparisons. The four $1^{st}$ tier control bits produced by each comparator are 715, 716, 717, 718. The $1^{st}$ tier control bits are used to select the largest of the two pixel counts being compared by their respective comparators by toggling an associated multiplexor (MUX), shown at 715M, 716M, 717M and 718M, respectively. In this example, the eight input pixel counts for the color cyan are: {nC=11, eC=4, sC=8, wC=10, neC=8, swC=10, nwC=12, seC=7}. The results are as follows.

The result of comparator 710 performing the comparison (neC≥swC) with respect to pixel counts 701 and 702 is: (8≥10)=FALSE. Thus, $1^{st}$ tier control bit 715='0' (FALSE). $1^{st}$ tier control bit 715 toggles MUX 715M to select the smaller of the two values being compared. Thus, the output 720 of MUX 715M is pixel count 702, i.e., (swC=10).

The result of comparator 711 performing the comparison (seC≥nwC) with respect to pixel counts 703 and 704 is that (7≥12)=FALSE. The $1^{st}$ tier control bit 716='0' (FALSE). $1^{st}$ tier control bit 716 toggles MUX 716M to select the smaller of the two values being compared. Thus, the output 721 of MUX 716M is pixel count 704, i.e., (nwC=12).

The result of comparator 712 performing the comparison (eC≥wC) with respect to pixel counts 705 and 706 is that (4≥10)=FALSE. The $1^{st}$ tier control bit 717='0' (FALSE). $1^{st}$ tier control bit 717 toggles MUX 717M to select the smaller of the two values being compared. Thus, the output 722 of MUX 717M is pixel count 706, i.e., (wC=10).

The result of comparator 713 performing the comparison (sC≥nC) with respect to pixel counts 707 and 708 is that (8≥11)=FALSE. The $1^{st}$ tier control bit 718='0'. $1^{st}$ tier control bit 718 toggles MUX 718M to select the smaller of the two values being compared. Thus, the output 723 of MUX 718M is pixel count 708, i.e., (nC=11).

The results of the four comparisons performed by $1^{st}$ tier circuit portion 700 are $1^{st}$ tier control bits 715='0', 716='0', 717='0', and 718='0' and four largest pixel counts 720=10, 721=12, 722=10, and 723=11. These value are provided as inputs to $2^{nd}$ tier circuit portion 800 of FIG. 8.

At step 508, the four largest pixel counts (720, 721, 722, 723) are compared to obtain, as a result of the comparisons, two $2^{nd}$ tier control bits. The $2^{nd}$ tier control bits produced as a result of each comparison are 827 and 828. The $2^{nd}$ tier control bits are used to select the largest of the two pixel counts being compared by toggling an associated MUX (827M and 828M). The results of these $2^{nd}$ tier comparisons are the two lowest pixel counts (830, 831) out of the previously selected four smallest pixel counts (720-721 and 722-723), respectively.

Comparator 825 compares smallest pixel counts 720 (swC=10) and 721 (nwC=12), i.e., (10≥12)=FALSE. A result of this comparison is $2^{nd}$ tier control bit 827='0'. $2^{nd}$ tier control bit 827 toggles MUX 827M to select the smaller of the two values being compared, i.e., lowest pixel count 830, (pixel count 721 (nwC=12)).

Comparator 826 compares largest pixel counts 722 (wC=10) and 723 (nC=11), i.e., (10≥11)=FALSE. A result of this comparison is $2^{nd}$ tier control bit 828='0'. $2^{nd}$ tier control bit 828 toggles MUX 828M to select the smaller of the two values being compared, i.e., lowest pixel count 831, as output 831, (pixel count 723 (nC=11)).

At step 510, the $2^{nd}$ tier control bits (827 and 828) are used to select two of the four $1^{st}$ tier control bits (715, 716, 717, 718). $2^{nd}$ tier control bit 827='0' toggles MUX 827X to select $1^{st}$ tier control bit 716='0' as output 835. Likewise, $2^{nd}$ tier control bit 828='0' toggles MUX 828X to select $1^{st}$ tier control bit 718='0' as output 836. It should be appreciated that the output of MUXs designated with an "X", i.e., MUX 827X and MUX 828X, is a control bit, whereas the output of MUXs designated with an "M" is a pixel count. The respective outputs of $2^{nd}$ tier circuit portion 800 are provided as inputs to $3^{rd}$ tier circuit portion 900.

Figure 6:
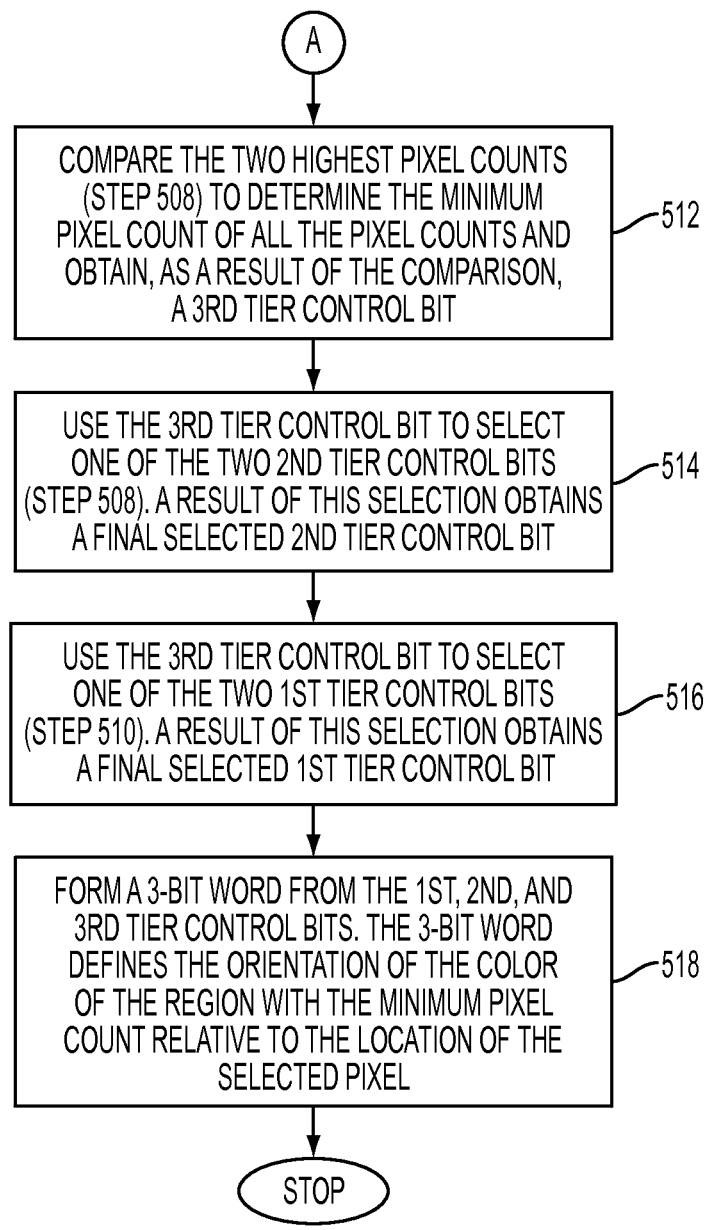
FIG. 6 is a continuation of the flow diagram of FIG. 5 with flow processing continuing with respect to node A.

Reference is now being made to FIG. 6 which is a continuation of the flow diagram of FIG. 5 with flow processing continuing with respect to node A.

Figure 9:
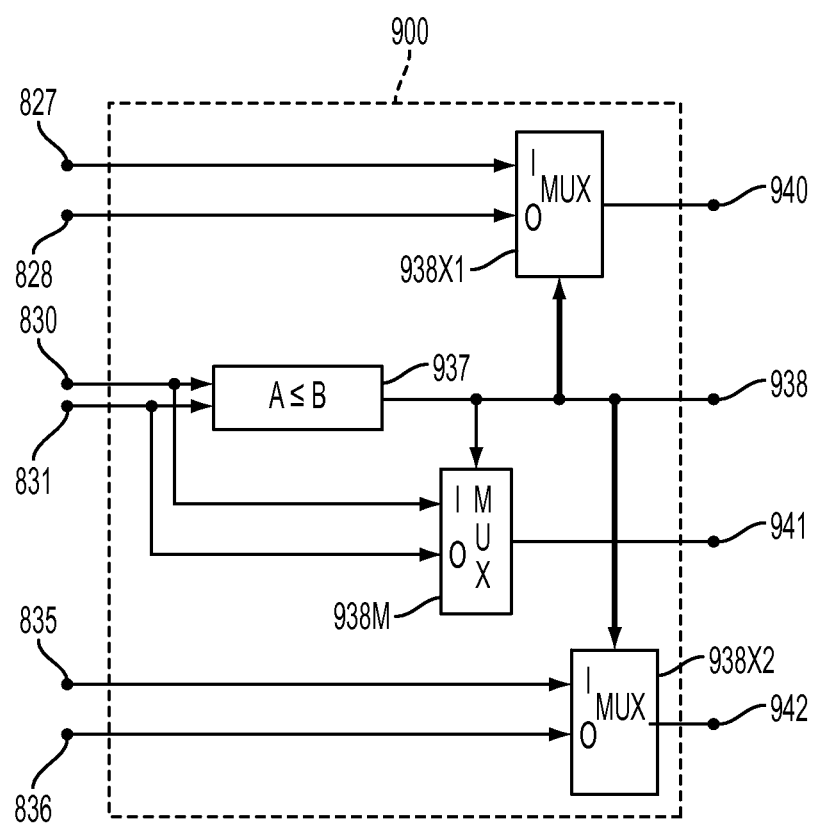
FIG. 9 illustrates a $3^{rd}$ tier circuit portion wherein various aspects of the flow diagrams are performed.

At step 512, the two lowest pixel counts (830 and 831) are compared together to determine a minimum pixel count of all the 8 pixel counts. In FIG. 9, comparator 937 compares lowest pixel counts 830 (nwC=12) and 831 (nC=11), i.e., (12≥11)=TRUE. The output 938 of comparator 937 is $3^{rd}$ tier control bit='1'. $3^{rd}$ tier control bit 938='1' toggles MUX 938M to select pixel count 830 (nwC=12) as output 941. Output 941 is the minimum pixel count of all the input pixel counts. A quick comparison of the pixel counts for each of the 8 regions shows that the minimum of all the input pixel counts is pixel count 704 (nwC=12).

At step 514, the $3^{rd}$ tier control bit (938) is used to select one of the $2^{nd}$ tier control bits (827 and 828). $3^{rd}$ tier control bit 938='1' toggles MUX 938X1 to select $2^{nd}$ tier control bit='0' (827), as output 940.

At step 516, the $3^{rd}$ tier control bit (938) is used to select one of the $1^{st}$ tier control bits (835 and 836). The $3^{rd}$ tier control bit 938='1' toggles MUX 938X2 to select $1^{st}$ tier control bit $1^{st}$ tier='0' (716), as output 942.

As a result of the above-described steps having been performed, a final $1^{st}$, $2^{nd}$ and $3^{rd}$ tier control bits have been obtained (942='0', 940='0', 938='1'), respectively. Also obtained is the minimum pixel count (941).

At step 518, a 3-bit word is formed using the $1^{st}$, $2^{nd}$ and $3^{rd}$ tier control bits. The 3-bit word defines the orientation of the region associated with the minimum pixel count of the color cyan relative to the location of the selected pixel.

Figure 10:
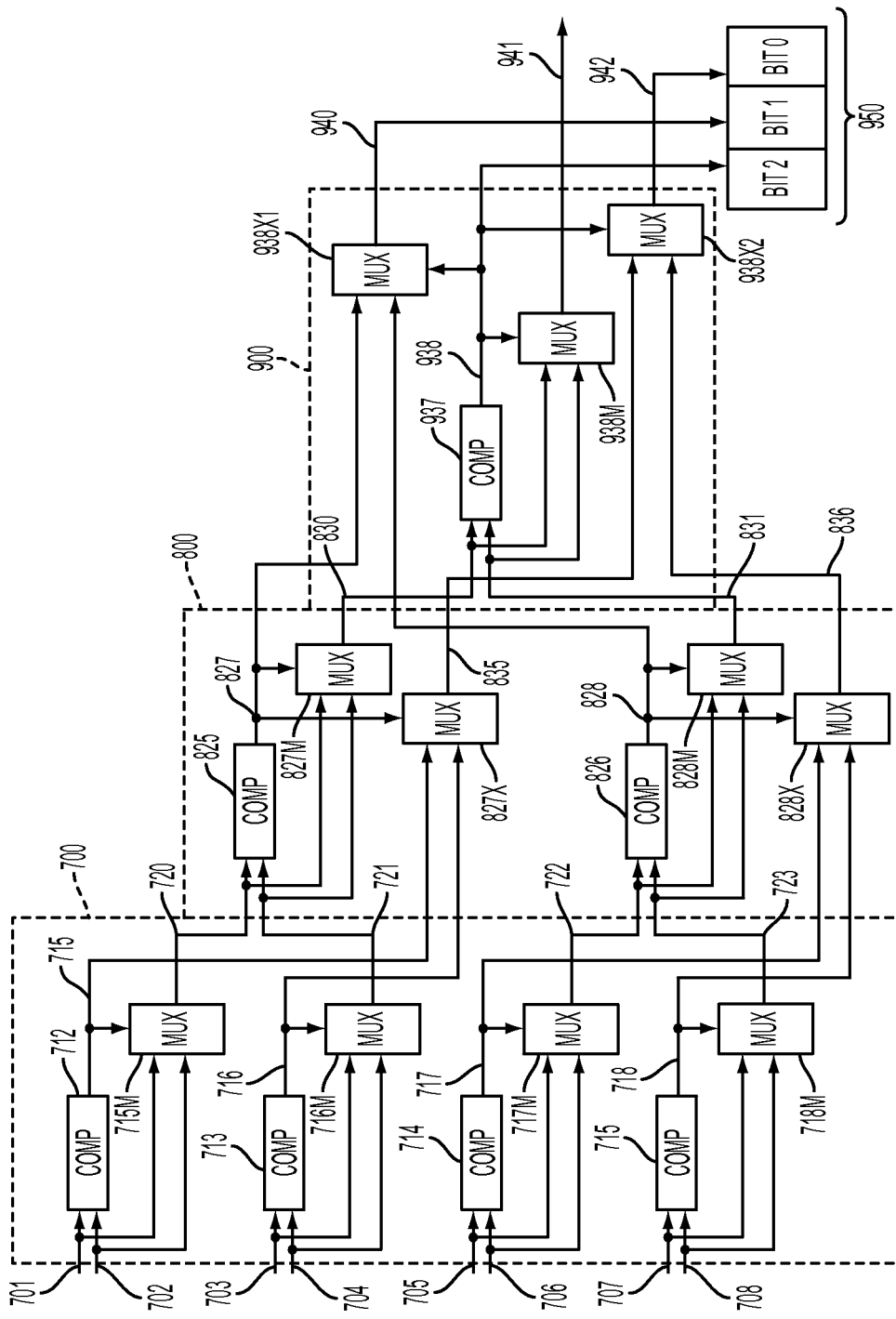
FIG. 10 illustrates the circuit portions of FIGS. 7, 8, and 9 combined.

As shown in FIG. 10, bit '0' of the 3-bit word 950 corresponds to 942 of MUX 638X2, i.e., $1^{st}$ tier control bit 716='0'. Thus, bit 0='0'. Bit '1' of the 3-bit word 950 corresponds to output 940 of MUX 638X1, i.e., $2^{nd}$ tier control bit 827='0'. Bit 1='0'. Lastly, bit 2 of the 3-bit word 950 corresponds to the $3^{rd}$ tier control bit 938='1'. Bit 2='1'. The 3 bit word formed is '100'=NW. The orientation of the region associated with the minimum pixel count (12) corresponding to pixel count 704 is northwest. This demonstrates that the method and the circuit configuration work as shown. The teachings hereof derive the minimum pixel count of regions surrounding the selected pixel while also determining the orientation associated with that minimum pixel count. In this example, the orientation direction of the cyan edge with respect to the pixel labeled "X" is primarily northwest. In this embodiment, further processing stops. In another embodiment, a next pixel and/or a next color are selected and the process repeats.

It should be appreciated that the flow diagrams hereof are illustrative. One or more of the operative steps illustrated in the flow diagram may be performed in a differing order. Other operations, for example, may be added, modified, enhanced, condensed, integrated, or consolidated. Such variations are intended to fall within the scope of the appended claims. All or portions of the flow diagrams may be implemented partially or fully in hardware in conjunction with machine executable instructions.

Example Special Purpose Computer

Figure 11:
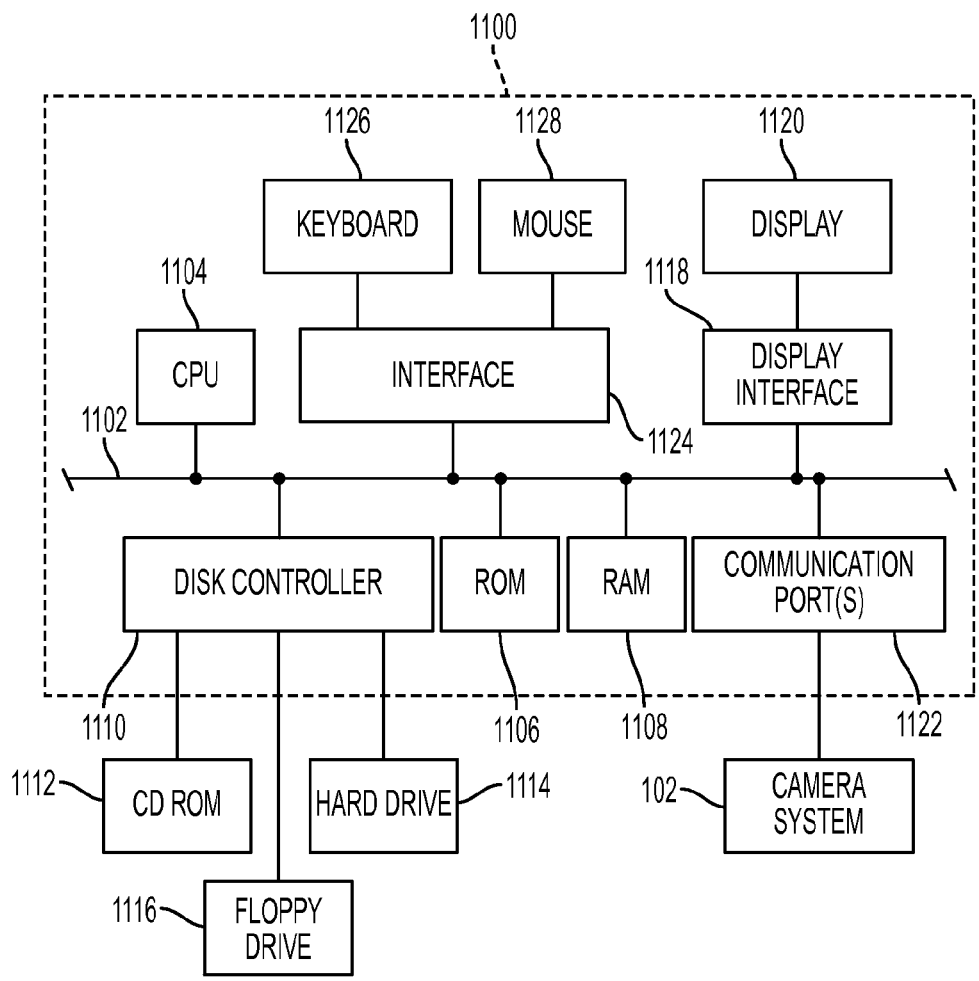
FIG. 11 illustrates a block diagram of one example special purpose computer for implementing one or more aspects of the present method as described with respect to the flow diagrams of FIGS. 5 and 6 and the circuit configurations shown and discussed with respect to the embodiments of FIGS. 7-10.

Reference is now being made to FIG. 11 which illustrates a block diagram of one example special purpose computer for implementing one or more aspects of the present method as described with respect to the flow diagrams of FIGS. 5 and 6, and the circuit diagram of FIGS. 7-10. Such a special purpose processor is capable of executing machine executable program instructions and may comprise any of a micro-processor, micro-controller, ASIC, electronic circuit, or any combination thereof.

In FIG. 11, communications bus 1102 is in communication with a central processing unit (CPU) 1104 capable of executing machine readable program instructions for performing any of the calculations, comparisons, logical operations, and other program instructions for performing any of the steps described above with respect to the flow diagrams hereof. Processor 1104 is in communication with memory (ROM) 1106 and memory (RAM) 1108 which, collectively, constitute example storage devices. Such memory may be used to store machine readable program instructions and other program data and results to sufficiently carry out any of the functionality described herein. Disk controller 1110 interfaces with one or more storage devices 1114 which may comprise external memory, zip drives, flash memory, USB drives, or other devices such as CD-ROM drive 1112 and floppy drive 1116. Storage device stores machine executable program instructions for executing the methods hereof. Such storage devices may be used to implement a database wherein various records are stored. Display interface 1118 effectuates the display of information on display 1120 in various formats such as, for instance, audio, graphic, text, and the like. Interface 1124 effectuates a communication via keyboard 1126 and mouse 1128, collectively via a graphical user interface. Such a graphical user interface is useful for a user to enter information about any of the displayed information in accordance with various embodiments hereof. Communication with external devices may occur using example communication port(s) 1122. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on a storage device readable by a machine architecture embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications.

Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A circuit for determining an orientation direction of a color edge at a pixel location in a color image, said system comprising:
    a first tier of circuitry receiving, as input, eight pixel counts each comprising a total number of pixels of a color in a region of a window centered on a selected pixel in a bitmap of a halftoned color image, said first tier circuit generating, as output, four largest pixel counts of said eight input pixel counts and four $1^{st}$ tier control bits used to select said four largest pixel counts;
    a second tier of circuitry receiving, as input, said four $1^{st}$ tier control bits and said four largest pixel counts, said second tier circuit generating, as output, two $2^{nd}$ tier control bits used to select two of the lowest pixel counts of said four largest pixel counts, and to select two of said four $1^{st}$ tier control bits; and
    a third tier of circuitry receiving, as input, said two selected lowest pixel counts, two of said selected $1^{st}$ tier control bits, and two of said selected $2^{nd}$ tier control bits, said third tier of circuitry generating, as output, a $3^{rd}$ tier control bit used to select one of said two selected $1^{st}$ tier control bits, one of said two $2^{nd}$ tier control bits, and a minimum pixel count of said two lowest pixel counts, said selected $1^{st}$, $2^{nd}$ and $3^{rd}$ tier control bits comprising a 3-bit word which defines an orientation direction of said color edge.

2. The circuit of claim 1, wherein said first tier circuit comprises four comparators and four multiplexors, each comparator comparing two of said eight total pixel counts, each comparator generating, as a result of said comparison, a $1^{st}$ tier control bit used to select a smaller of two pixel counts using one of said multiplexors.

3. The circuit of claim 1, wherein said second tier circuit comprises two comparators and four multiplexors, each comparator comparing two of said four input pixel counts selected by said first tier circuit, each comparator generating, as a result of said comparison, a $2^{nd}$ tier control bit used to select a lowest of said two input smaller pixel counts using a first two of said multiplexors and to select two of said four $1^{st}$ tier control bits using a second two of said multiplexors.

4. The circuit of claim 1, wherein said third tier circuit comprises a comparator and two multiplexors, said comparator comparing two of said lowest pixels counts selected by said second tier circuit, said comparator generating, as a result of said comparison, a $3^{rd}$ tier control bit used to select a minimum pixel count for all of said regions, and to select one of said two selected $1^{st}$ tier control bits, and one of said two selected $2^{nd}$ tier control bits.

5. The system of claim 1, wherein said orientation directions associated with said 3-bit word comprises: '000'=N., '001'=S., '010'=W., '011'=E., '100'=NW., '101'=SE., '110'=SW., and '111'=NE..

6. A computer implemented method for determining an orientation direction of a color edge at a pixel location in a color image, the method comprising:
    receiving a plurality of pixel counts, each pixel count comprising a total number of pixels of a color in a region of a window centered on a selected pixel in a bitmap of a color image, each of said regions being associated with an orientation direction relative to said selected pixel;
    comparing each of said pixel counts for each of said regions to determine a minimum pixel count, a result of each of said comparisons producing a $1^{st}$, $2^{nd}$ and $3^{rd}$ tier control bit; and
    forming a 3-bit word using said $1^{st}$, $2^{nd}$ and $3^{rd}$ tier control bits, said 3-bit word defining an orientation direction of a color edge wherein said selected pixel resides.

7. The computer implemented method of claim 6, wherein each of said regions has a unique orientation directions comprising: {N., E., S., W., NE., SW., NW., SE.}.

8. The computer implemented method of claim 6, wherein comparing each of said pixel counts for each of said regions comprises:
    comparing pixel counts for each of four pairs of regions, each of said comparison generating a $1^{st}$ tier control bit used to select a largest pixel count for each compared pair;
    comparing said four largest pixel counts, a result of each comparison producing a $2^{nd}$ tier control bit used to select a lowest pixel count for each pair; and
    comparing said two lowest pixel counts together, a result of said comparison producing a $3^{rd}$ tier control bit used to select a minimum pixel count of all of said received plurality of pixel counts.

9. The computer implemented method of claim 8, further comprising:
    using each of said two $2^{nd}$ tier control bits to select two of said four $1^{st}$ tier control bits; and
    using said $3^{rd}$ tier control bit to select one of said two $1^{st}$ tier control bits and one of said two $2^{nd}$ tier control bits.

10. The computer implemented method of claim 8, wherein each of said four pairs of regions have orientation directions that are diametrically opposed comprising: <N., S.>, <E.,W.>, <NE.,SW.>, and <SE.,NW.>.

11. The computer implemented method of claim 6, wherein said 3-bit word defining said orientation directions comprises: '000'=N., '001'=S., '010'=W., '011'=E., '100'=NW., '101'=SE., '110'=SW., and '111'=NE.

12. A system for determining an orientation direction of a color edge at a pixel location in a color image, the system comprising:
   a memory;
   a storage medium for storing data; and
   a processor in communication with said memory and said storage medium, said processor executing machine readable instructions for performing:
      receiving a plurality of pixel counts, each pixel count comprising a total number of pixels of a color in a region of a window centered on a selected pixel in a bitmap of a color image, each of said regions being associated with an orientation direction relative to said selected pixel;
      comparing pixel counts for each of four pairs of regions, a result of each comparison producing a $1^{st}$ tier control bit used to select a largest pixel count for each pair;
      comparing said four largest pixel counts, a result of each comparison producing a $2^{nd}$ tier control bit used to select a lowest pixel count for each pair;
      comparing said two lowest pixel counts together, a result of said comparison producing a $3^{rd}$ tier control bit;
      using each of said two $2^{nd}$ tier control bits to select two of said four $1^{st}$ tier control bits;
      using said $3^{rd}$ tier control bit to select one of said two $1^{st}$ tier control bits;
      using said $3^{rd}$ tier control bit to select one of said two $2^{nd}$ tier control bits; and
      using said selected $1^{st}$, $2^{nd}$ and $3^{rd}$ tier control bits to form a 3-bit word which defines the orientation direction for said color edge.

13. The system of claim 12, wherein each of said eight regions has a unique orientation directions obtained from the set comprising: {N., E., S., W., NE., SW., NW., SE.}.

14. The system of claim 13, wherein each of said four pairs of regions have orientation directions that are diametrically opposed, comprising: <N.,S.>, <E.,W.>, <NE.,SW.>, and <SE.,NW.>.

15. The system of claim 12, wherein said 3-bit word defining said orientation directions comprises: '000'=N., '001'=S., '010'=W., '011'=E., '100'=NW., '101'=SE., '110'=SW., and '111'=NE.

* * * * *